(12) United States Patent
Nelson et al.

(10) Patent No.: US 7,577,875 B2
(45) Date of Patent: Aug. 18, 2009

(54) STATISTICAL ANALYSIS OF SAMPLED PROFILE DATA IN THE IDENTIFICATION OF SIGNIFICANT SOFTWARE TEST PERFORMANCE REGRESSIONS

(75) Inventors: Bruce L. Nelson, Woodinville, WA (US); Brian T. Klamik, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 441 days.

(21) Appl. No.: 11/227,799

(22) Filed: Sep. 14, 2005

(65) Prior Publication Data

US 2007/0061626 A1    Mar. 15, 2007

(51) Int. Cl.
*G06F 11/00* (2006.01)

(52) U.S. Cl. .............................. 714/38; 714/33; 702/57; 717/120; 717/124

(58) Field of Classification Search ................... 714/38, 714/33; 702/57; 717/120, 124
See application file for complete search history.

(56) References Cited

U.S. PATENT DOCUMENTS

| | | | | |
|---|---|---|---|---|
| 5,325,525 | A * | 6/1994 | Shan et al. ................... | 718/104 |
| 5,694,540 | A * | 12/1997 | Humelsine et al. ............ | 714/38 |
| 5,784,554 | A * | 7/1998 | Hsiung ......................... | 714/45 |
| 5,798,950 | A * | 8/1998 | Fitzgerald ..................... | 703/17 |
| 6,047,389 | A * | 4/2000 | Thai .............................. | 714/38 |
| 6,049,798 | A * | 4/2000 | Bishop et al. ................. | 707/10 |
| 6,347,366 | B1 * | 2/2002 | Cousins ....................... | 711/170 |
| 6,434,714 | B1 * | 8/2002 | Lewis et al. ................... | 714/38 |
| 6,519,766 | B1 * | 2/2003 | Barritz et al. ............... | 717/130 |
| 6,604,210 | B1 * | 8/2003 | Alexander et al. ............ | 714/39 |
| 6,807,522 | B1 * | 10/2004 | Orfali .......................... | 703/22 |
| 6,810,495 | B2 * | 10/2004 | Castelli et al. ................ | 714/47 |
| 6,966,013 | B2 * | 11/2005 | Blum et al. .................... | 714/38 |
| 7,243,145 | B1 * | 7/2007 | Poortman .................... | 709/223 |
| 7,490,325 | B2 * | 2/2009 | Jackson ....................... | 718/100 |
| 7,496,900 | B2 * | 2/2009 | Dimpsey et al. ............. | 717/128 |
| 2001/0020284 | A1 * | 9/2001 | Tsuda et al. .................. | 714/37 |
| 2002/0120797 | A1 * | 8/2002 | Fabre .......................... | 710/60 |
| 2003/0085888 | A1 * | 5/2003 | Lafruit ........................ | 345/419 |
| 2003/0112758 | A1 * | 6/2003 | Pang et al. ................... | 370/235 |
| 2003/0204759 | A1 * | 10/2003 | Singh .......................... | 713/320 |
| 2004/0073475 | A1 * | 4/2004 | Tupper ........................ | 705/10 |
| 2004/0154001 | A1 * | 8/2004 | Haghighat et al. .......... | 717/130 |
| 2004/0254765 | A1 * | 12/2004 | Lee et al. ..................... | 702/186 |
| 2005/0065746 | A1 * | 3/2005 | Dohle et al. ................. | 702/113 |
| 2005/0102114 | A1 * | 5/2005 | Yasala .......................... | 702/65 |
| 2005/0120111 | A1 * | 6/2005 | Bailey et al. ................. | 709/224 |
| 2005/0267702 | A1 * | 12/2005 | Shah et al. ..................... | 702/81 |
| 2005/0283664 | A1 * | 12/2005 | Coulter et al. ................ | 714/15 |
| 2006/0005082 | A1 * | 1/2006 | Fossum et al. ................ | 714/42 |

(Continued)

*Primary Examiner*—Scott T. Baderman
*Assistant Examiner*—Loan Truong
(74) *Attorney, Agent, or Firm*—Woodcock Washburn LLP

(57) ABSTRACT

Sampled profile data provides information about processor activity during a test. Processor activity can be analyzed to determine an amount of processor resources used to execute the various functions, modules, and processes associated with a tested software activity. Statistical methods can be applied to the resource data from multiple test runs to determine whether a significant regression has occurred between a baseline test pass and a daily test pass. By collecting data at the function, module and process levels, significant regressions may be uncovered at any of the levels. Regressions may also be ranked according to their importance, which allows for identification and notification of development teams responsible for significant regressions.

19 Claims, 4 Drawing Sheets

U.S. PATENT DOCUMENTS

2006/0129892 A1* 6/2006 Diaconu et al. ............... 714/38
2006/0150190 A1* 7/2006 Gusler et al. ................ 718/105
2006/0200546 A9* 9/2006 Bailey et al. ................ 709/224
2007/0028010 A1* 2/2007 Krasnansky ................. 710/18
2007/0050677 A1* 3/2007 Klamik ....................... 714/38

* cited by examiner

STATISTICAL ANALYSIS OF SAMPLED PROFILE DATA IN THE IDENTIFICATION OF SIGNIFICANT SOFTWARE TEST PERFORMANCE REGRESSIONS

BACKGROUND

Software product quality is increasingly important for competitive advantage in commercial software development. A number of industrial benchmarks exist that consumers utilize in making buying decisions. Meeting or exceeding such benchmarks requires software design that is effective, reliable, and fast. Monitoring the performance of computer programs under development is an important aspect of improving software product quality.

Monitoring performance of software under development should be frequent and effective. In the typical software development environment, change to the source code is ongoing and developers working on isolated subsystems are often unaware of whether their changes adversely affect performance of the larger system. Compounding this is the fact that many different hardware processors, such as a Central Processing Unit (CPU) and Graphics Processing Unit (GPU), are supported and each may have their own unique performance properties. In addition, modern system and driver designs attempt to maximize utilization of the processor(s) through multitasking and caching techniques, which in turn results in random variability of performance. If a serious performance regression is introduced and not discovered until a much later time, then debugging the initial cause of the regression may be a difficult and expensive task.

Available techniques for monitoring software performance are slow and difficult. Due to a huge number of possible hardware configurations in modern computing, the practical problem of identifying and analyzing regressions in software performance on a wide range of hardware configurations is a daunting task. Test results can proliferate. The amount of time required to manually analyze the results to identify regressions and their probable causes is impractical, often resulting in less frequent and therefore less effective product testing. Automated techniques are necessary to process the sheer number of tests in a comprehensive test pass, so that meaningful regressions can be identified without painstaking manual analysis.

SUMMARY

The invention provides an automated process that can be implemented through software executed by a computer. The process generates a list of parts of a tested software program that are responsible for significant performance regressions in the tested software. The list may be ranked by significance, thereby indicating which parts of the tested software are most likely responsible for a regression. By indicating which parts of a tested program are responsible for regressions, investigation and improvement of software under development is facilitated.

The process analyzes sampled profile data, which provides information about processor activity during a test. An amount of processor resources used to execute the various functions, modules, and processes of tested software can be determined. Statistical methods can be applied to data from multiple test runs to determine whether a significant regression has occurred between a first and second test pass.

By collecting data at the function, module and process levels, significant regressions may be uncovered at any of the levels. This allows for identification and notification of development teams responsible for the parts of a tested software program that were responsible for significant regressions. Other advantages and features of the invention are described below.

BRIEF DESCRIPTION OF THE DRAWINGS

The systems and methods for analysis of sampled profile data in accordance with the present invention are further described with reference to the accompanying drawings in which.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

A tool for gathering performance analysis data is the sampling profiler. Using this tool, a sampled profile of processor activity is obtained as a program executes by recording a process and address information at fixed intervals.

Figure 1:
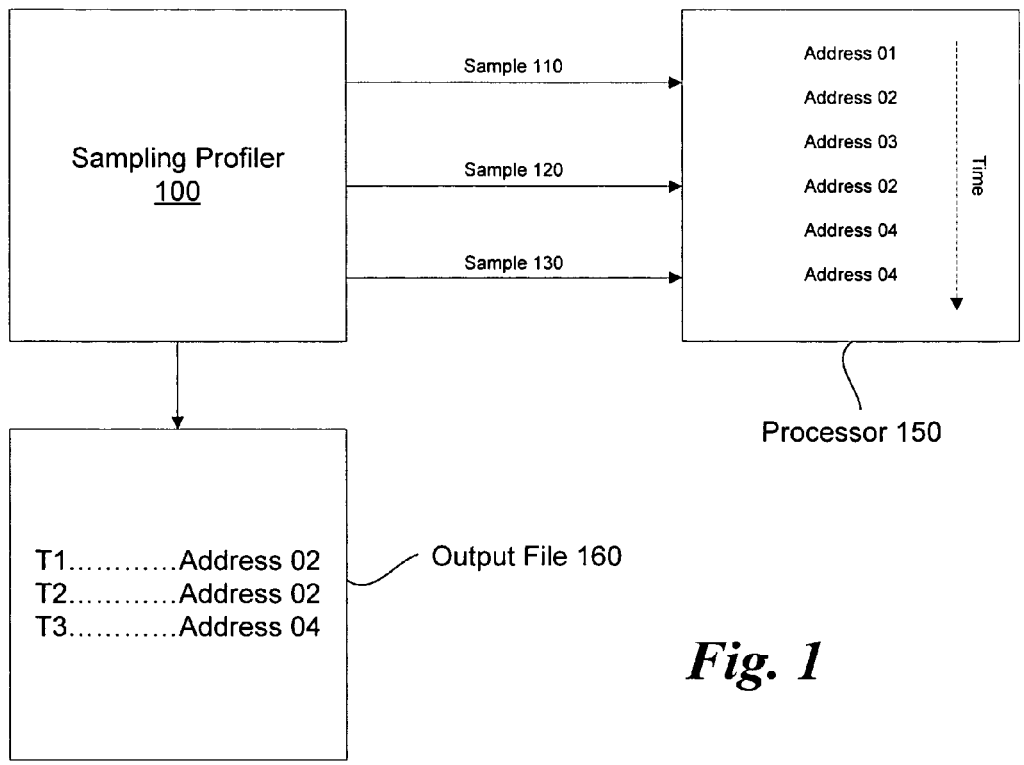
FIG. 1 illustrates exemplary operation of a sampling profiler.

Exemplary operation of a sampling profiler is illustrated in FIG. 1. As illustrated, operations of a processor 150 may be associated with addresses, for example address 01, 02, 03, and 04. At any time T, the processor 150 may be operating on a particular address. Thus, as illustrated in FIG. 1, processor 150 first operates on address 01, then 02, 03, 02, 04, and finally 04.

Sampling profiler 100 may sample the operations of processor 150 to determine what processor 150 is doing when sampled. Sampling profiler may comprise software that is itself executed by processor 150. As such, it is possible that processor 150, when sampled, will be shown to be carrying out an operation associated with the execution of sampling profiler 100 itself. However, it is also likely that processor 150 will be executing some other software at a time of sampling. For example, processor 150 may be executing software that is being tested. Sampling profiler 100 may be built into test harness software that causes tested software to execute. For example, in WINDOWS® based systems, sampling profiler 100 could comprise the Event Tracing for WINDOWS® (ETW) technology, which can sample processor activity and which generates a log (such as output file 160) called an Event Trace Log (ETL).

Sampling profiler 100 may periodically sample processor 150. Three samples are illustrated in FIG. 1. A first sample 110 is taken at time T1, a second sample 120 is taken at time T2, and a third 130 at time T3. The results can be logged to an output file 160. Here, the output file 160 records the sample data, showing that at T1 processor 150 was operating on address 02, at T2 processor 150 was operating on address 02, and at T3 it was operating on address 04. A sampling profiler 100 may also log processes associated with the various addresses 02 and 04 (process data not illustrated in FIG. 1). Other possible features of a profiler 100 are known to those of skill and need not be discussed here.

With sampled profile data, it is possible to estimate how much processor resources were dedicated to carrying out the various activities associated with a tested program. For example, a hypothetical program might play music and video. By using a profiler when running this hypothetical program, and inspecting the profiler's output data, it is possible to determine with some degree of accuracy how much time the processor spent handling video operations, and how much time the processor spent handling music operations. Some known set of addresses would be associated with functions for music playing operations. The number of samples showing these known addresses correlates to an amount of processor resources dedicated to playing music. Resources dedicated to video operations can be determined similarly. As the term is used herein, an amount of processor "resources" may correspond to an amount of processor time. It may also correspond to a number of processor clock cycles. Any useful unit of measurement may be used to measure processor resources.

A performance regression occurs when a software program or some aspect of a program takes either less or more processor resources to execute in one test than in another test. It is important to identify performance regressions in program development, because it is generally desirable to have all aspects of a program execute as fast as possible under the applicable circumstances, and also because regressions may indicate problems in program design.

Problems in identifying regressions include a likelihood of identifying insignificant regressions, which takes time away from investigating more significant regressions. There is inevitably some degree of error in sampled data, which results in regressions reflected in the sampled data when in fact there were none. Moreover, computers are complex systems, and any number of events may occur which cause insignificant regressions that need not warrant investigation.

A solution to problems in identifying regressions involves automated determinations of which regressions are significant. As will be shown below, statistical techniques may be applied across sampled profile data to find significant regressions. Furthermore, regressions may be ranked based on how significant they are. This allows investigators to more easily determine what regressions require investigation.

A clear description of the various techniques provided herein requires introduction of the following concepts: First, the decomposition of executables into a hierarchy of operations will be introduced. Next, an exemplary test process for testing software will be described. Once these concepts are introduced, techniques that may be applied for automated analysis of sampled profile data will be set forth.

With respect to decomposition of executables into a hierarchy, the well-known WINDOWS® operating system can be used as an example. In WINDOWS® based machines, program execution is associated with one or more processes that are managed by the operating system. Processes may comprise any number of modules. Modules may in turn comprise any number of functions. When executing a particular function, a processor may be directed to one or more individual addresses. Thus, if an address is identified in sampled profile data, a corresponding function, module, and process that a processor was working on at the time of sampling may be extrapolated. This description will use terminology, as introduced above, that is associated with the WINDOWS® operating system, understanding that similar technologies may be present in other systems, and that the terms used here need not refer only to the WINDOWS® embodiment.

Figure 2:
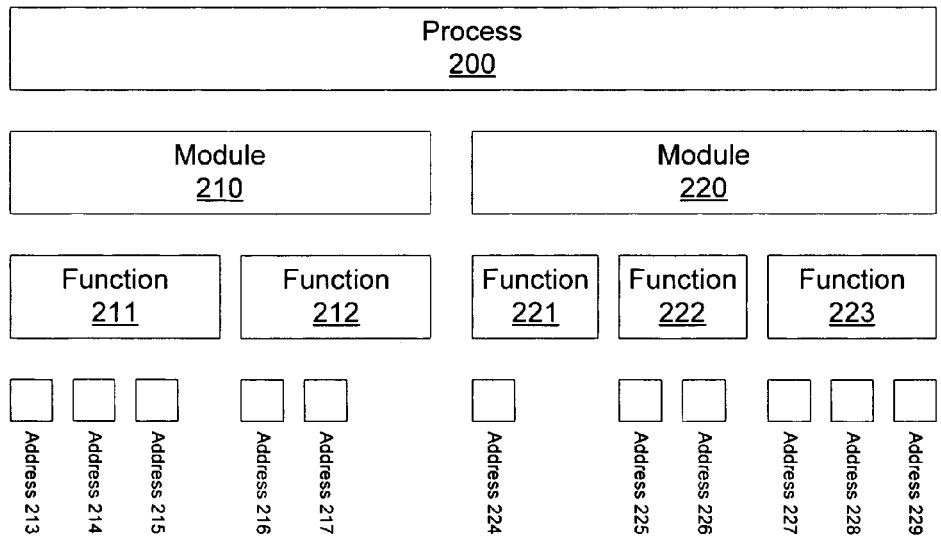
FIG. 2 illustrates a hierarchy of process 200, modules 210, 220, functions 211, 212, 221, 222, 223, and addresses 213-217, 224-229.

FIG. 2 demonstrates a hierarchy of process 200, modules 210, 220, functions 211, 212, 221, 222, 223, and addresses 213-217, 224-229. If sampled profile data indicates a processor was operating on address 213, it can be extrapolated that the operation was for the purpose of executing function 211, module 210, and process 200. Similarly, if data indicates that a process was operating on address 227, it can be extrapolated that the operation was for the purpose of executing function 223, module 220, and process 200. Other operating systems may use variants of this hierarchical process, module, function, address system and it will be appreciated that the discussion here of processes, modules, and functions can be carried over to other systems that may use different naming conventions or different but nonetheless hierarchical architectures.

With respect to an exemplary test process for testing software, tests can be designed to measure a software activity of interest. Test harness software will cause the tested software activity to execute for a specified duration of time, sampling processor activity all the while, to ensure that enough samples are collected for accurate analysis. A count of the number of iterations the activity is executed may be maintained.

A test may thus be referred to as a test pass, which may in turn comprise some predetermined number of test runs. For example, a test pass may comprise four profiled test runs. Multiple test runs are used to compensate for variability in the runs.

To identify regressions, data from one test pass are compared to data from another. One of the two test passes is labeled baseline, and the other is labeled daily. The baseline is the past performance state of software activity under test, and the daily is the current state of a new build of said software activity.

Automated analysis of profile data to identify significant regressions can be carried out in a system that manages program execution in a hierarchical manner as described above. A mean amount of processor resources required to execute each function, module, and process can be calculated by comparing the resources needed for each test run in a test pass. Some error amount is associated with the mean amount. The error depends on the value distribution and number of runs.

Figure 3:
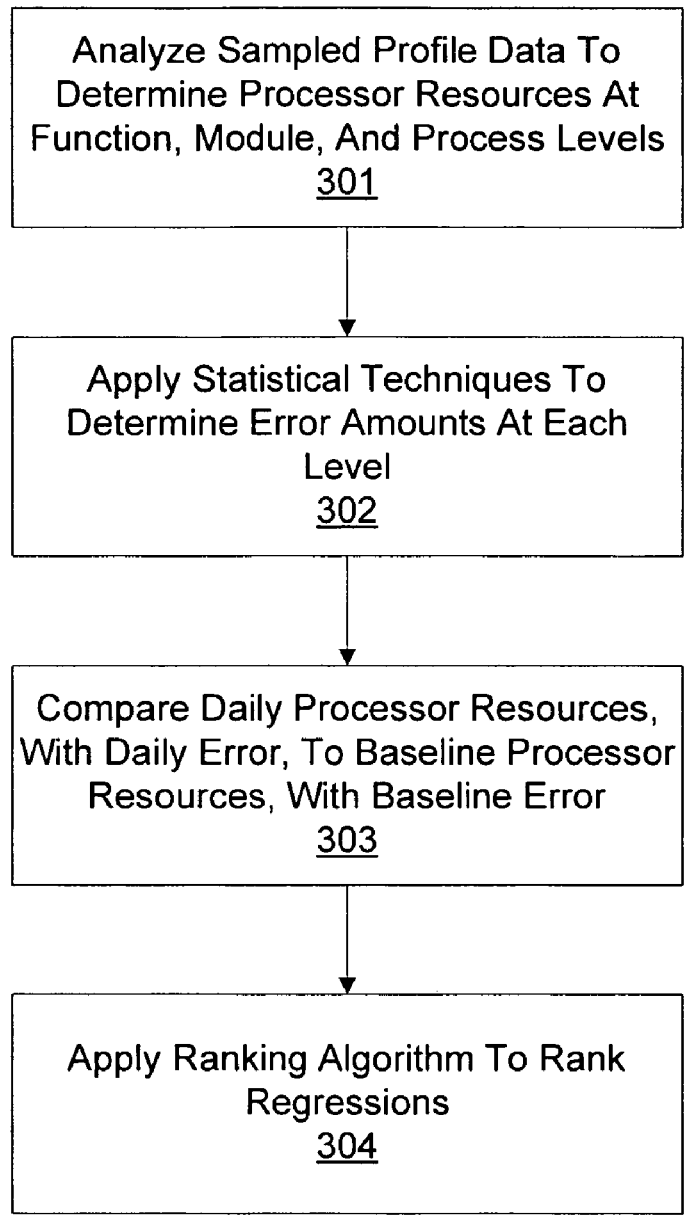
FIG. 3 illustrates an overview of a process for automated analysis of sampled profile data.

FIG. 3. provides an overview of a process for automated analysis of sampled profile data. The process illustrated in FIG. 3 can be implemented in software and carried out by a computer that comprises the basic functional elements illustrated in FIG. 5. In general, the process may comprise first analyzing sampled profile data to determine processor resources at function, module and process levels 301. Next, statistical techniques can be applied across the results from step 301 for multiple runs, to determine mean amounts of resources and error amounts at each level 302. Next, the mean resource amounts and errors from a daily test pass can be compared to those from the baseline test pass, to determine if there are statistically significant regressions 303. Finally, regressions can be ranked using a ranking algorithm 304. The end result is a ranking of software components that are most likely responsible for any performance regressions of the tested software activity.

Referring back to step 301, in order to analyze sampled profile data to determine processor resources at function, module and process levels, first an appropriate hierarchy of process, module, function, and address names is constructed. This can be done through analysis of a profiler output file, such as an ETL file containing the profile data. For each profile event within the activity, the symbolic name of the module and function is determined from the process and address provided by the event. A hierarchy of process, module, function, and address names is constructed.

Figure 4:
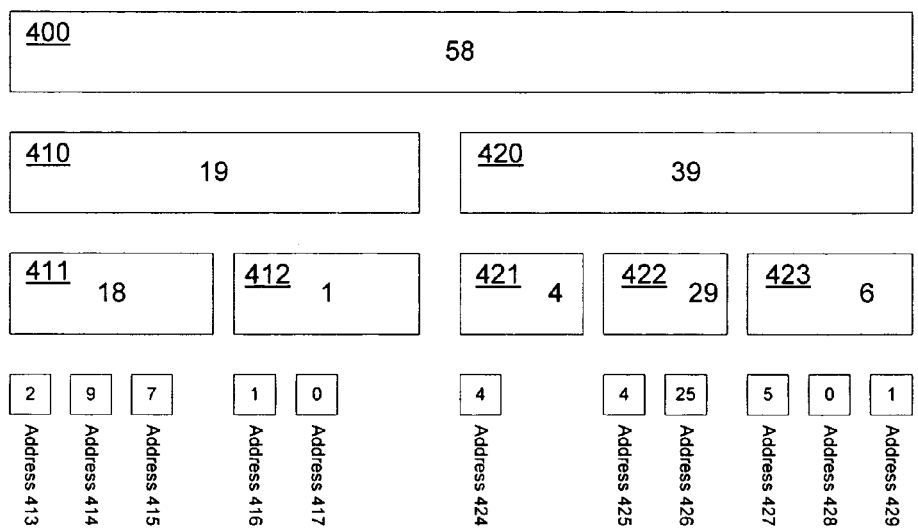
FIG. 4 illustrates how sample data indicating processor activity at various addresses can be used to calculate processor resources needed to execute each of the various levels of a hierarchically organized software program under test. The resources directed to the various addresses of a function are accumulated in the function, the resources directed to the various functions of a module are accumulated in the module, and so forth.

FIG. 4 provides an illustration of an exemplary hierarchy. Here, an exemplary process 400 comprises two modules 410 and 420. Module 410 comprises functions 411 and 412. Function 411 is associated with addresses 413, 414, and 415. Function 412 is associated with addresses 416 and 417. Module 420 is associated with functions 421, 422, and 423. Function 421 is associated with address 424. Function 422 is associated with addresses 425 and 426. Function 423 is associated with addresses 427, 428, and 429. Processes may comprise any number of modules, and modules may contain any number of functions. FIG. 4 illustrates one possible hierarchy that may be constructed using an exemplary profiler output file.

Sample counts may initially be available only at the address level. As illustrated in FIG. 4, address 413 got 2 counts, 414 got 9 counts, 415 got 7 counts, and so on. This represents that as the profiler was sampling processor activity, it found that the processor was operating on address 413 two times. To determine processor resources at function, module and process levels, counts at the lower levels can be accumulated. Thus, function 411 has 18 counts, which represents the 2+9+7=18 counts at the addresses 413, 414, and 415 associated with module 411. Module 410 has 19 counts, which represents the 18+1=19 counts of functions 411 and 412. Process 400 has 58 counts, which represents the 19+39=58 counts of modules 410 and 420.

At each level, the number of sampled counts and the total percentage of resources attributed to that level may be determined. The top level contains the total number of sampled counts and accounts for 100% of the profiled time. An example of a partial profile hierarchy showing process, module, function, and address sample counts and corresponding percentages of processor resources dedicated to each is shown below in tree format:

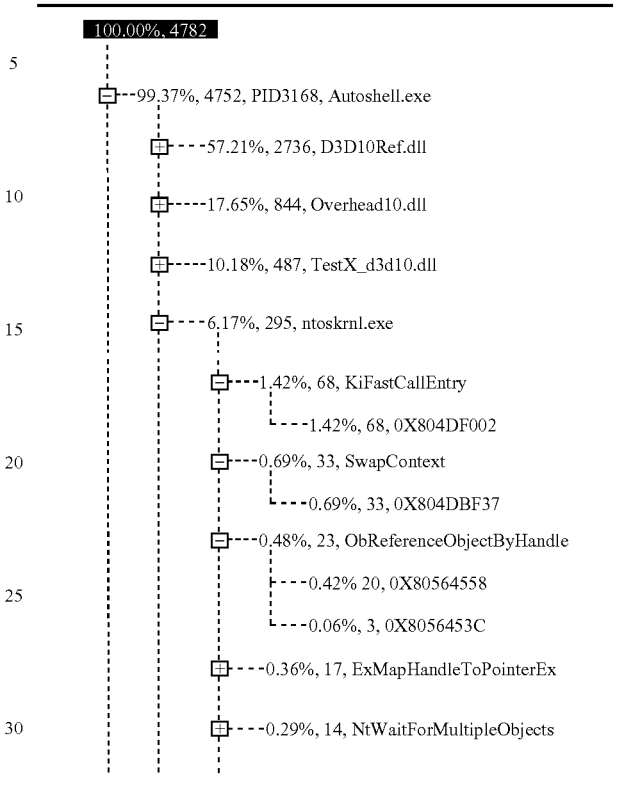

To facilitate comparison of profile data from two or more test passes, sample counts can be normalized as Central Processing Unit (CPU) cycles per iteration. Numbers in the above tree thus reflect processor clock cycles as a measure of processor resources at process, module, and function levels. This is calculated by taking the proportion of sampled counts at each level multiplied by the total elapsed CPU cycles of the activity and dividing by the number of iterations. This value provides an estimate of the CPU cycles per iteration for that process, module, function, or address.

Each run in a test pass may generate a unique profile hierarchy. To facilitate automated analysis of the data, the hierarchies may next be flattened and accumulated in maps as follows:

(process, module, function)→($R_1$, $R_2$, $R_3$, $R_4$)
(process, module)→($R_1$, $R_2$, $R_3$, $R_4$)
(process)→($R_1$, $R_2$, $R_3$, $R_4$)

Where R1, R1, R3, and R4 represent processor resources used in a run 1, run 2, run 3 and run 4, and where (process, module, function) uniquely identifies a function, (process, module) uniquely identifies a module, and (process) uniquely identifies a process. Thus, $R_i$ represents normalized CPU cycles per iteration computed at one of the hierarchical levels for a run. Note that it is possible for an $R_i$ to be zero, in which case no samples where collected in that run for the level in question. Since these maps are independent but processed in a similar manner, the notation σ→($R_1$, $R_2$, $R_3$, $R_4$) will be used to refer to any of the forms listed above.

Referring back to FIG. 3, once all the run data for the baseline and daily test passes is read and stored in the maps pursuant to step 301, the data may be analyzed using statistical techniques 302. Statistical techniques are employed to determine if regressions between baseline and daily tests are significant. There are a variety of statistical methods that are known to those of skill in mathematics, and one available method will be set forth here, without limiting the invention to the details of any particular method, but rather for the purpose of demonstrating how such methods may be employed in the spirit of the invention.

The first step in an exemplary application of a statistical analysis is to compute the mean CPU cycles per iteration for each σ. Where four runs are used, this can be done by adding the R1, R2, R3, and R4 values for a function, module, or process, and dividing by four. Next, an error measure is calculated based on the $(R_1, R_2, R_3, R_4)$ values. Errors can be calculated at any selected confidence level. Where a higher confidence level is desired, larger error amounts will result. 95% confidence has been found to be a good number, however the desired confidence level may vary based on the software and testing environment. Error is a term that is understood in the field of statistics, and it generally provides a number that when added and subtracted from a mean value, marks the boundaries of a range within which one can be 95% (or any selected confidence level) confident that a subsequent measurement will also fall in the range.

In one statistical method, a t distribution is used to obtain a t-critical value given an alpha=0.05. The result is a map $\sigma \rightarrow V \pm E$, where V is the computed mean and E the computed error. Note that both values are in the same units (i.e. CPU cycles per iteration) and that $E \geq 0$. Some minimum error number may be selected to ensure that $E \geq 0$.

To summarize the process up to this point, at this point a mean value of processor resources and an associated error are calculated for each function, module, and process. Having this information, we are ready to compare these numbers from the daily test pass to the numbers from the baseline test pass. This is step 303 in FIG. 3.

To compare data from the baseline and daily passes, matching σ are used as the equivalent comparator. Using boundary arithmetic the difference of $V_2 \pm E_2$ and $V_1 \pm E_1$ is $(V_2-V_1) \pm (E_2+E_1)$. This results in the map $\sigma \rightarrow (D \pm E, V_1 \pm E_1, V_2 \pm E_2)$ where $V_1, E_1$ is the baseline value, $V_2, E_2$ is the daily value, and D, E is the difference (daily−baseline).

Another advantage of the techniques provided here is that they can identify significant regressions at one level, for example at the module level, even if no significant regressions are identified at levels beneath that level. While perhaps the specific problem leading to a regression may be more difficult to identify from the module or process level data than the function level data, the team responsible for the module or process can at least be notified and instructed that their module or process is the cause of a regression.

Referring to step 304 in FIG. 3, regressions may also be ranked according to significance. To rank the regressions from most significant to least, a ranking computation $|D|*(1-E/|D|)$ may be used. As the magnitude of the error approaches the magnitude of the difference, the ratio $E/|D|$ gets close to one (or greater) and therefore $(1-E/|D|)$ approaches zero (or negative). The smaller resulting number implies that the difference is less important since there is high variability in the underlying results. The error ratio is then multiplied by the magnitude of the difference, $|D|$. In this way large differences are given more significance. The most probable cause of a problem with a tested software activity will have the greatest difference and least error whereas the least probable cause will have the smallest difference and greatest error. In this way, error magnitude as well as difference magnitude can be accounted for when ranking regressions.

The output can be displayed in a filtered or an unfiltered state. In the filtered output, any difference where $E/|D| \geq 1$ is discarded. The unfiltered display displays all differences. If in the filtered analysis we see nothing survives the filtering process, then it is unlikely that the profile information is useful in identifying the cause of the regression. Shown below is a filtered output for a tested software activity that demonstrated a 20% regression of approximately 4762 CPU cycles per iteration:

|  | Difference | Baseline | Daily |
|---|---|---|---|
| Process | | | |
| Autoshell.exe | 4753.77 ± 192.65 | 22625.36 ± 33.59 | 27379.13 ± 159.06 |
| | 4753.77 ± 192.65 | | |
| Module {'Autoshell.exe'} | | | |
| D3D10Core.dll | 2829.18 ± 511.91 | 1538.92 ± 126.76 | 4368.1 ± 385.15 |
| dxgi.dll | 2376.64 ± 93.77 | 1616.73 ± 44.52 | 3993.38 ± 49.25 |
| D3D10Ref.dll | −2024.32 ± 370.27 | 13656.31 ± 236.55 | 11631.99 ± 133.72 |
| TestX_d3d10.dll | 1499.63 ± 485.66 | 1588.92 ± 235.46 | 3088.55 ± 250.21 |
| | 4681.13 ± 1461.61 | | |
| Function | | | |
| D3D10Core.dll | | | |
| CDevice::ID3D10Device_RSSetState_ | 2794.76 ± 473.01 | 1249.66 ± 93.12 | 4044.41 ± 379.9 |
| | 2794.76 ± 473.01 | | |
| dxgi.dll | | | |
| CUseCountedObject<NOutermost::CDeviceChild>::UCAddUse | 2363.4 ± 133.96 | 554.07 ± 37.83 | 2917.47 ± 96.13 |
| | 2363.4 ± 133.96 | | |
| D3D10Ref.dll | | | |
| UMDevice::ReserveDMABuffer | −1024.85 ± 109.03 | 2075.91 ± 57.43 | 1051.06 ± 51.59 |
| HWCmdDrawIndexed::Create | −860.5 ± 144.64 | 1571.84 ± 121.31 | 711.34 ± 23.33 |
| HWCmdSetRasterizerState::Create | −468.38 ± 135.14 | 1809.93 ± 61.78 | 1341.55 ± 73.36 |
| UMShader::CastFrom | −329.59 ± 37.62 | 329.59 ± 29.08 | 0 ± 8.54 |

-continued

|  | Difference | Baseline | Daily |
|---|---|---|---|
| UMElementLayout::CastFrom | 348.5 ± 87.87 | 0 ± 7.12 | 348.5 ± 80.75 |
| UMDevice::SetRasterizerState_Default | 302.39 ± 203.94 | 1611.65 ± 149.73 | 1914.04 ± 54.21 |
| TestX_d3d10.dll | −2032.43 ± 718.23 | | |
| Dx3DDevice_DrawIndexed::onActivity | 1709.31 ± 425.52 | 850.22 ± 220.22 | 2559.53 ± 205.3 |
|  | 1709.31 ± 425.52 | | |

An exemplary computation of significant test performance regressions is instructive. Using the hypothetical numbers introduced in FIG. 4, we can first determine normalized CPU cycles per iteration, then conduct a statistical analysis of the test results, and finally compare test results across multiple test passes.

Normalized CPU Cycles Per Iteration

The data in FIG. 4 represents sample profile data obtained from a single test run. To calculate normalized CPU cycles per iteration, two additional pieces of information are needed: the number of times the test activity is repeated, and the total CPU cycles to complete the test activity. For this example we will say the test activity was repeated 50 times and it took a total of 18,730 CPU cycles. This then corresponds to 374.6 CPU cycles per iteration (i.e. 18,730/50). We can estimate the CPU cycles per iteration for each function based on the sample profiled proportions as shown below.

| (Process, Module, Function) | Number Samples | Porportion | CPU Cyles per Iteration |
|---|---|---|---|
| (400, 410, 411) | 18 | 31.0% | 116.26 |
| (400, 410, 412) | 1 | 1.7% | 6.46 |
| (400, 420, 421) | 4 | 6.9% | 25.83 |
| (400, 420, 422) | 29 | 50.0% | 187.30 |
| (400, 420, 423) | 6 | 10.3% | 38.75 |
| Totals | 58 | 100% | 374.6 |

For each of the test runs, this procedure may be repeated with different repetition and CPU cycle values. The following shows an example of a possible test pass results comprising four runs.

| (Process, Module, Function) | $Run_1$ | $Run_2$ | $Run_3$ | $Run_4$ |
|---|---|---|---|---|
| (400, 410, 411) | 116.26 | 115.34 | 116.91 | 114.62 |
| (400, 410, 412) | 6.46 | 8.77 | 6.64 | 0.00 |
| (400, 420, 421) | 25.83 | 22.59 | 24.04 | 15.66 |
| (400, 420, 422) | 187.30 | 176.90 | 182.43 | 191.52 |
| (400, 420, 423) | 38.75 | 42.81 | 37.92 | 43.06 |

This data can then be rolled-up to the (Process, Module) and Process levels by summing the lower levels.

| (Process, Module) | $Run_1$ | $Run_2$ | $Run_3$ | $Run_4$ |
|---|---|---|---|---|
| (400, 410) | 122.72 | 124.11 | 123.55 | 114.62 |
| (400, 420) | 226.05 | 219.71 | 220.35 | 234.58 |

| (Process) | $Run_1$ | $Run_2$ | $Run_3$ | $Run_4$ |
|---|---|---|---|---|
| (400) | 348.77 | 343.82 | 343.9 | 349.2 |

Statistical Analysis

Given the set of run data that corresponds to the (Process, Module, Function) the computation of a 95% confidence interval may be performed by first finding the t-critical value of the Student's T Distribution. For alpha=0.05 and degrees of freedom=3, the t-critical value is 3.18 and is found using standard statistical tables.

The mean and standard deviation values may next be computed from the run data. From this the Std. Error=Stdev/$\sqrt{N}$ and Confidence Interval=t-critical * Std. Error are computed as shown below.

| (Process, Module, Function) | Mean | Std. Deviation | Std. Error | Confidence Interval |
|---|---|---|---|---|
| (400, 410, 411) | 115.78 | 1.01 | 0.50 | 1.60 |
| (400, 410, 412) | 5.47 | 3.79 | 1.90 | 6.04 |
| (400, 420, 421) | 22.03 | 4.45 | 2.22 | 7.08 |
| (400, 420, 422) | 184.54 | 6.30 | 3.15 | 10.03 |
| (400, 420, 423) | 40.64 | 2.68 | 1.34 | 4.26 |

Using such an analysis, the estimated CPU cycles per iteration of our (Process, Module, Function) sample data are:

(400,410,411)→115.78±1.60
(400,410,412)→5.47±6.04
(400,420,421)→22.03±7.08
(400,420,422)→184.54±10.03
(400,420,423)→40.64±4.26

In a similar fashion the data for the higher-level maps are found.

| (Process, Module) | Mean | Std. Deviation | Std. Error | 95% Confidence |
|---|---|---|---|---|
| (400, 410) | 121.25 | 4.46 | 2.23 | 7.09 |
| (400, 420) | 225.17 | 6.89 | 3.44 | 10.96 |

(400,410)→121.25±7.09
(400,420)→225.17±10.96

| (Process) | Mean | Std. Deviation | Std. Error | 95% Confidence |
|---|---|---|---|---|
| (400) | 346.42 | 2.96 | 1.48 | 4.72 |

(400)→346.42±4.72

Comparison of Test Pass Results

Assume now we have another set of data representing the new daily test pass.

| (Process, Module, Function) | Run$_1$ | Run$_2$ | Run$_3$ | Run$_4$ |
|---|---|---|---|---|
| (400, 410, 411) | 112.20 | 118.85 | 114.29 | 115.56 |
| (400, 410, 412) | 6.57 | 5.77 | 5.15 | 7.09 |
| (400, 420, 421) | 29.54 | 29.61 | 29.84 | 29.58 |
| (400, 420, 422) | 182.84 | 182.98 | 183.64 | 184.62 |
| (400, 420, 423) | 42.32 | 39.41 | 38.25 | 40.64 | and using the previous mathematical analysis the estimated CPU cycles per iteration are:

(400,410,411)→112.20±4.44
(400,410,412)→6.14±1.36
(400,420,421)→29.64±0.21
(400,420,422)→183.52±1.29
(400,420,423)→40.16±2.77
(400,410)→121.37±4.38
(400,420)→223.68±2.84
(400)→345.05±4.78

We are interested in determining if a function has changed. The difference may be computed by subtracting the baseline means from the daily means and summing the errors.

| (Process, Module, Function) | Difference | Baseline | Daily |
|---|---|---|---|
| (400, 410, 411) | −3.58 ± 6.04 | 115.78 ± 1.60 | 112.20 ± 4.44 |
| (400, 410, 412) | 0.67 ± 7.4 | 5.47 ± 6.04 | 6.14 ± 1.36 |
| (400, 420, 421) | 7.61 ± 7.29 | 22.03 ± 7.08 | 29.64 ± 0.21 |
| (400, 420, 422) | −1.02 ± 11.32 | 184.54 ± 10.03 | 183.52 ± 1.29 |
| (400, 420, 423) | −0.48 ± 7.03 | 40.64 ± 4.26 | 40.16 ± 2.77 |

The ranking statistics $|D|*(1-E/|D|)$ may then be computed:

| (Process, Module, Function) | $\|D\|$ | E | 1 − E/\|D\| | \|D\| * (1 − E/\|D\|) |
|---|---|---|---|---|
| (400, 410, 411) | 3.58 | 6.04 | −0.69 | −2.46 |
| (400, 410, 412) | 0.67 | 7.4 | −10.04 | −6.73 |
| (400, 420, 421) | 7.61 | 7.29 | 0.04 | 0.32 |
| (400, 420, 422) | 1.02 | 11.32 | −10.10 | −10.3 |
| (400, 420, 423) | 0.48 | 7.03 | −13.65 | −6.55 | and ordered using a descending sort:

| (Process, Module, Function) | \|D\| * (1 − E/\|D\|) |
|---|---|
| (400,420,421) | 0.32 |
| (400,410,411) | −2.46 |
| (400,420,423) | −6.55 |
| (400,410,412) | −6.73 |
| (400,420,422) | −10.3 |

From this, we may conclude that a possible regression occurred in (400,420,421). In the filtered analysis any values such that $(1-E/|D|) \leqq 0$ could be discarded, since the error is greater than the difference. Also, since the errors (variability) are so great and differences in mean so small, observe that the (Process, Module) and Process analysis was not useful in detecting the regression for this case.

| (Process, Module) | \|D\| | E | 1 − E/\|D\| |
|---|---|---|---|
| (400, 410) | 0.12 | 11.47 | −94.58 |
| (400, 420) | 1.49 | 12.9 | −7.65 |
| Process | \|D\| | E | 1 − E/\|D\| |
| (400) | 0.37 | 9.5 | −24.58 |

Figure 5:
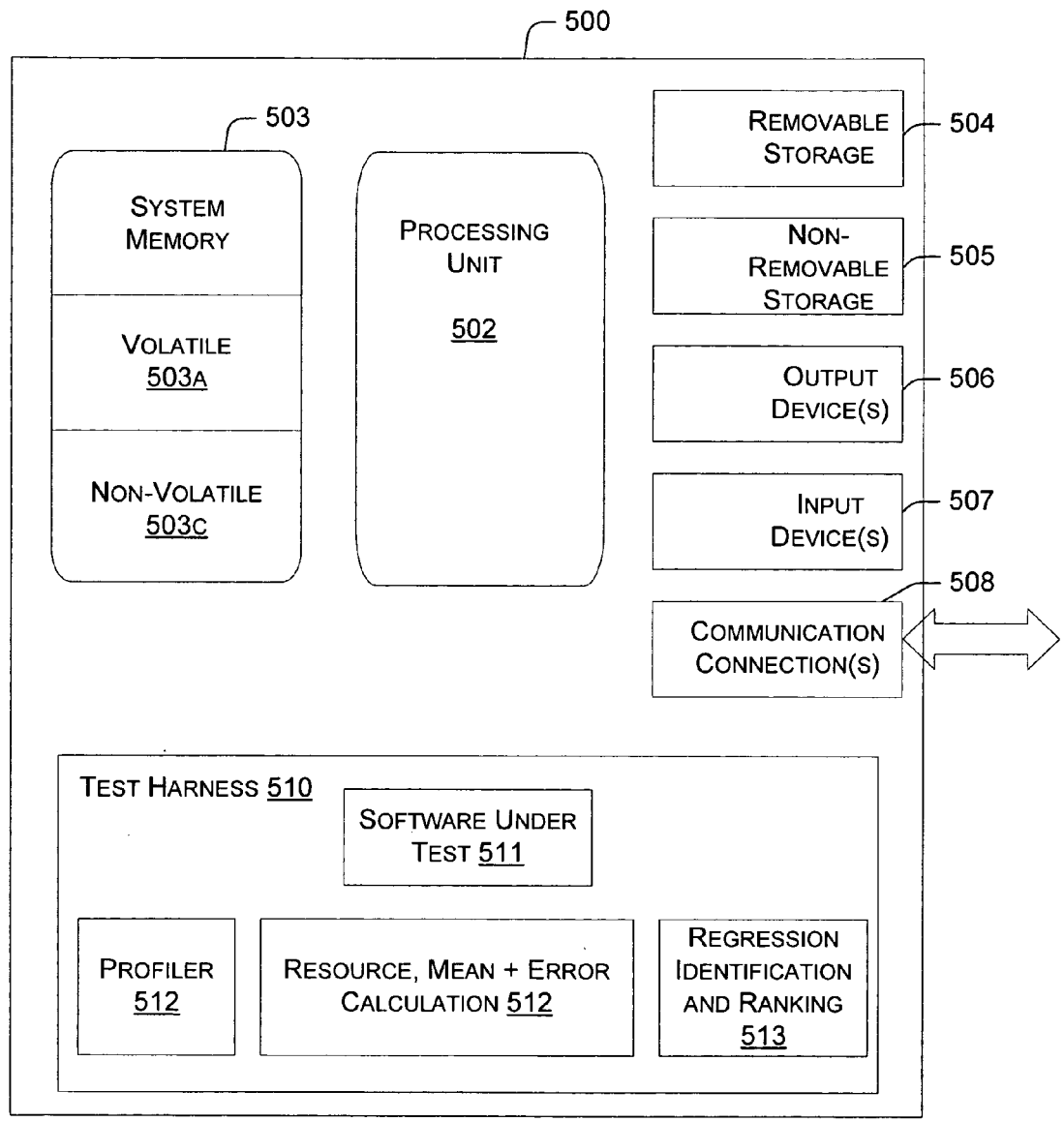
FIG. 5 illustrates a computing device with components for carrying out the automated processes described herein.

FIG. 5 illustrates the basic elements of a computing device 500 suitable to carry out the processes described herein. In its most basic configuration, device 500 typically includes a processing unit 502 and memory 503. Depending on the exact configuration and type of computing device, memory 503 may be volatile 503A (such as RAM), non-volatile 503C (such as ROM, flash memory, etc.) or some combination of the two. Additionally, device 500 may also have mass storage (removable 504 and/or non-removable 505) such as magnetic or optical disks or tape. Similarly, device 500 may also have input devices 507 such as a keyboard and/or output devices 506 such as a display. Other aspects of device 500 may include network connections 508 to other devices, computers, networks, servers, etc. using either wired or wireless media. All these devices are well known in the art and need not be discussed at length here.

Computer 500 may further comprise software in the form of computer executable instructions stored for example in memory 503, storage 504, 505, or remotely available over connection 508. Such software may include a test harness 501 that implements the process described above. In this regard, a test harness 510 may cause a plurality of test runs, wherein tested software 511 executes on a computer processor 502 in each test run. Test harness 510 may further comprise or activate a profiler 512 for sampling processor 502 activity during execution of said tested software 511, thereby generating sample data. Test harness 510 may further comprise or activate software 512 for calculating from said sample data an amount of processor 502 resources in each test run that was dedicated to executing at least one function associated with the tested software 511, and also for calculating from said amount of processor resources in each test run a mean amount of processor resources dedicated to executing the at least one function and an error amount associated with said mean amount. Finally, test harness 510 may further comprise or activate software 513 for comparing said mean amount and said error amount to a previous mean amount and a previous error amount from a previous test to determine if there is a significant regression in the amount of processor 502 resources dedicated to executing the at least one function, and also for ranking regressions according to an amount of difference between said mean amount and said previous mean amount, while accounting for said error amount and said and previous error amount.

In light of the diverse computing configurations available to those of skill in the art, the systems and methods provided herein cannot be construed as limited in any way to a particular computing architecture, operating system, test harness software, or profiler. Instead, the present invention should not be limited to any single embodiment, but rather should be construed in breadth and scope in accordance with the appended claims.

The invention claimed is:

1. In a system for analyzing computer test results, said test results comprising a plurality of sampled processor events, a method comprising:
   computing an amount of processor resources used to execute each memory address in each function, a memory address comprising a subset of a function;
   computing an amount of processor resources used to execute each function in each module based on the amount of processor resources used to execute each memory address of each function, a function comprising a subset of a module;

computing an amount of processor resources used to execute each module in said process based on the amount of processor resources used to execute each function of each module, a module comprising a subset of a process;

computing an amount of processor resources used to execute the process based on the amount of processor resources used to execute each module of the process;

for each amount of processor resources used to execute each process computed, each amount of processor resources used to execute each module computed, each amount of processor resources used to execute each function computed;

computing an error amount associated with said amount of processor resources;

computing said amount of processor resources and said error amount with amounts from a previous test; and finding a significant regression if said amount of processor resources differs from an amount of processor resources from the previous test, after accounting for said error amount and an error amount from the previous test.

2. The method of claim 1, further comprising ranking the regression among a plurality of regressions according to an amount of difference between said amount of processor resources and the amount of processor resources from the previous test.

3. The method of claim 1, wherein computing an amount of processor resources comprises computing a mean amount of processor resources used to execute the function, and where the mean is computed using results from multiple runs of a test.

4. The method of claim 3, wherein said computing an error amount comprises computing a statistical error amount based at least in part on a number of runs of the test.

5. The method of claim 1, further comprising computing an amount of processor resources that was used to execute a module by combining one or more amounts of processor resources that were used to execute one or more functions associated with the module.

6. The method of claim 5, further comprising computing at least one module error amount.

7. The method of claim 6, further comprising finding a module regression if said amount of processor resources that was used to execute a module differs from an amount of processor resources that was used to execute the module from the previous test, after accounting for said error amount and an error amount from the previous test.

8. A system for testing computer software, comprising:
a processor;
a test harness for causing a plurality of test runs, wherein a test run comprises executing tested software on the processor;
a profiler for sampling processor activity during executing of said tested software, thereby generating sample data;
software for calculating from said sample data an amount of processor resources in each test run used to execute each memory address in each function, a memory address comprising a subset of a function;
software for calculating from said sample data an amount of processor resources in each test run used to execute each function in each module based on the amount of processor resources used to execute each memory address of each function, a function comprising a subset of a module;
software for calculating from said sample data an amount of processor resources in each test run used to execute each module in said process based on the amount of processor resources used to execute each function of each module, a module comprising a subset of a process;
software for calculating from said sample data an amount of processor resources in each test run used to execute the process based on the amount of processor resources used to execute each module of the process;
software for calculating from said each amount of processor resources in each test run a mean amount of processor resources dedicated to executing the corresponding function, module or process and an error amount associated with said mean amount;
software for comparing said mean amount and said error amount to a previous mean amount and a previous error amount from a previous test to determine if there is a significant regression in the amount of processor resources dedicated to executing the function module or process.

9. The system of claim 8, wherein said software for comparing comprises instructions for ranking regressions according to an amount of difference between said mean amount and said previous mean amount, while accounting for said error amount and said and previous error amount.

10. The system of claim 8, wherein said software for calculating from said sample data an amount of processor resources also calculates an amount of processor resources in each test run that was dedicated to executing at least one module associated with the tested software.

11. The system of claim 8, wherein said error amount represents a 75%-99% confidence in said mean amount of processor resources dedicated to executing the at least one function.

12. The system of claim 8, further comprising software for discovering from said sample data at least on function, module, and process associated with the tested software.

13. The system of claim 8, wherein the profiler is an Event Tracing for WINDOWS® (ETW) profiler.

14. A method to be carried out by a computer for ranking software test regressions, comprising:
calculating a mean amount of processor resources that are dedicated to executing a function, wherein said processor resources are measured in Central Processing Unit (CPU) clock cycles;
calculating an error associated with said mean amount;
calculating a difference between said mean amount and a previous mean amount, wherein said error amount to and a previous error amount are accounted for;
ranking a regression based on said difference; and
filtering the regression if the error amount and the previous error amount are greater than a simple difference between said mean amount and a previous mean amount.

15. The method of claim 14 wherein said calculating a mean amount, calculating an error, calculating a difference, and ranking are also carried out for a module.

16. The method of claim 14 wherein said calculating a mean amount, calculating an error, calculating a difference, and ranking are also carried out for a process.

17. The method of claim 14 wherein said difference is calculated using the equation $|D|*(1-E/|D|)$.

18. The method of claim 14 wherein there is statistically a 75%-99% confidence that a subsequent test would dedicate to executing said function an amount of processor resources determinable from said mean amount and said error amount.

19. The method of claim 14 wherein said processor resources are measured in Central Processing Unit (CPU) clock cycles.

* * * * *